United States Patent [19]
Chen

[11] Patent Number: 6,067,458
[45] Date of Patent: May 23, 2000

[54] METHOD AND APPARATUS FOR PRE-TRANSMISSION POWER CONTROL USING LOWER RATE FOR HIGH RATE COMMUNICATION

[75] Inventor: Tao Chen, San Diego, Calif.

[73] Assignee: Qualcomm Incorporated, San Diego, Calif.

[21] Appl. No.: 08/886,605

[22] Filed: Jul. 1, 1997

[51] Int. Cl.$^7$ ...................................................... H04B 1/00
[52] U.S. Cl. ............................ 455/522; 455/39; 455/69; 455/517
[58] Field of Search .................................. 455/15, 39, 69, 455/504, 507, 517, 522, 63, 67.1

[56] References Cited

U.S. PATENT DOCUMENTS

| | | | |
|---|---|---|---|
| 5,461,639 | 10/1995 | Wheatley, III et al. | 375/205 |
| 5,528,593 | 6/1996 | English et al. | 455/403 |
| 5,621,723 | 4/1997 | Walton, Jr. et al. | 370/18 |
| 5,754,961 | 5/1998 | Serizawa et al. | 455/517 |
| 5,812,938 | 9/1998 | Gilhousen et al. | 455/69 |

FOREIGN PATENT DOCUMENTS

| | | | |
|---|---|---|---|
| 9638938 | 12/1996 | WIPO | H04B 7/26 |
| 9700562 | 1/1997 | WIPO | H04B 17/00 |
| 9718643 | 5/1997 | WIPO | H04B 7/005 |

*Primary Examiner*—Curtis A. Kuntz
*Assistant Examiner*—Binh K. Tieu
*Attorney, Agent, or Firm*—Philip R. Wadsworth; Roger W. Martin; Sean English

[57] ABSTRACT

The present invention employs a method and apparatus for providing improved power control when changing the rate at which data is sent in a communications system. When data arrives at the transmitter for transmission at a high rate, power control feedback is changed from a slow mode (with a low bandwidth feedback channel) to a fast mode (with a high bandwidth feedback channel). This control changes even before the data is transmitted at the high rate. Once the power level is accurately estimated for data transmission at the high rate, then data transmission begins at the high rate.

3 Claims, 6 Drawing Sheets

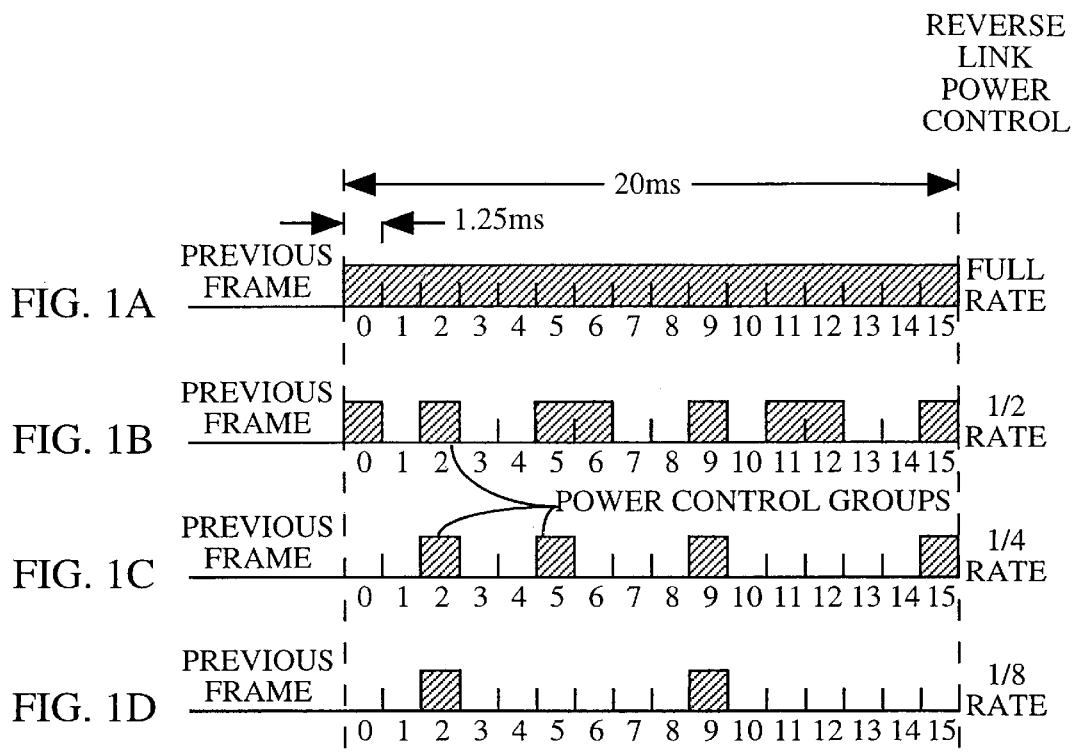
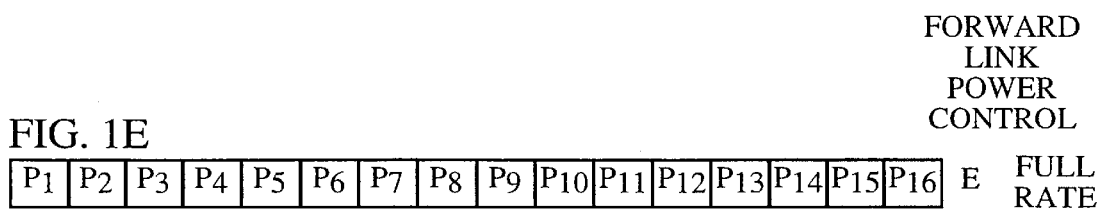
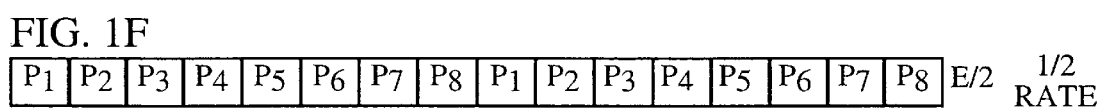
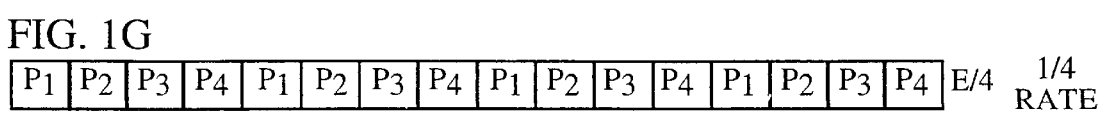
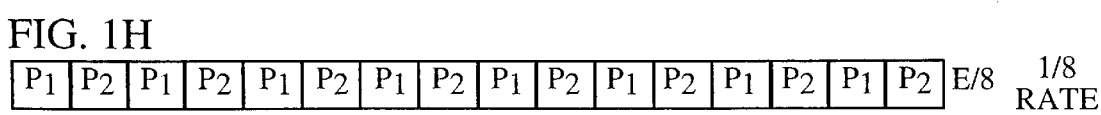

METHOD AND APPARATUS FOR PRE-TRANSMISSION POWER CONTROL USING LOWER RATE FOR HIGH RATE COMMUNICATION

BACKGROUND OF THE INVENTION

I. Field of the Invention

The present invention relates to communication systems. More particularly, the present invention relates to a method and apparatus for providing power control in a closed-loop communication system.

II. Description of the Related Art

The use of code division multiple access (CDMA) modulation techniques is one of several techniques for facilitating communications in which a large number of system users are present. Although other techniques such as time division multiple access (TDMA), frequency division multiple access (FDMA), and AM modulation schemes such as amplitude companded single sideband (ACSSB) are known, CDMA has significant advantages over these other techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and assigned to the assignee of the present invention and incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM," assigned to the assignee of the present invention and incorporated by reference herein.

CDMA by its inherent nature of being a wideband signal offers a form of frequency diversity by spreading the signal energy over a wide bandwidth. Therefore, frequency selective fading affects only a small part of the CDMA signal bandwidth. Space or path diversity is obtained by providing multiple signal paths through simultaneous links from a mobile user or mobile station through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM," and U.S. Pat. No. 5,109,390, entitled "DIVERSITY RECEIVER IN A CDMA CELLULAR TELEPHONE SYSTEM," both assigned to the assignee of the present invention and incorporated by reference herein.

If the transmission power of signals transmitted by the base station to a mobile station are too high, problems such as interfering with other mobile stations and expending unnecessary power are likely. Alternatively, if the transmission power of signals transmitted by the base station are too low, the mobile station can receive multiple erroneous transmitted frames. Terrestrial channel fading and other known factors affect the transmission power of signals transmitted by the base station, so that channel conditions change over time, especially as the mobile station moves. As a result, each base station must rapidly and accurately adjust the transmission power for the signals which it transmits to the mobile stations.

In a useful method for controlling the transmission power of signals transmitted by a base station, the mobile station measures the condition of such transmitted signals. The mobile station then transmits a signal corresponding to the measured power level, or compares the power level to a threshold value and transmits a signal or message to the base station when the power of a transmitted frame of data deviates from the threshold. In response to the received signal, the base station adjusts its transmission power of signals transmitted by the base station; if the power level is lower than desired, the base station increases the transmission power of its transmitted signals, otherwise, the transmission power is decreased. A method and apparatus for controlling transmission power is disclosed in U.S. Pat. No. 5,056,109, entitled "METHOD AND APPARATUS FOR CONTROLLING TRANSMISSION POWER IN A CDMA CELLULAR TELEPHONE SYSTEM," assigned to the assignee of the present invention and incorporated by reference herein.

A delay necessarily exists under the above CDMA closed-loop communication system. The delay includes the time of the base station transmitting the frame with inadequate power, the mobile station receiving the degraded or erroneous frame, the mobile station recognizing the error (e.g., the signal falls below the threshold or a frame is erased), the mobile station transmitting an appropriate error message to the base station, and the base station receiving the error message and appropriately adjusting its transmission power. The CDMA communication system, typically, transmits packets of data as discrete frames. As a result, the CDMA communications system cannot rapidly compensate for transmission power fluctuations. Additionally, the mobile station could request too great of an increase in the forward link transmission power before recognizing such an increase due to the delay.

Furthermore, the bandwidth of the channel over which the mobile station relays signals to the base station can be limited. For example, nearly all of the bandwidth for this channel is dedicated to transmitting voice traffic to the base station. Little or no bandwidth remains to transmit signals to the base station reflecting the measured power level of the signals transmitted by the base station. Therefore, such signals transmitted by the mobile station could only request that the base station increase or decrease the transmission power by a small amount. Consequently, if deep fades affect the transmitted signals, the base station may not be able to react quickly enough to increase its transmission power and calls can be undesirably terminated.

Information signals sent from the base station to a mobile station include voice information, error correction codes, identification codes and others. Increased bandwidth needed for power control information comes at the expense of the size of one or more of these other signals.

When transmitting from the mobile station to the base station, i.e., along the reverse link, the mobile station transmits signals in a series of frames. Each frame contains 16 power control groups. Each group contains an identical and predetermined number of encoded data symbols. A graphical showing of reverse link power control is shown in FIGS. 1A–1D, which shows power control group transmissions, respectively, at the full rate, half rate, quarter rate, and eighth rate.

When transmitting from the mobile station at the full rate, all 16 of the power control groups are sent. When transmitting at the half rate, however, only one-half of the 16 power control groups are sent (i.e., 8 power control groups). Accordingly, four power control groups are sent in one frame while transmitting in the quarter rate and only two power control groups are sent in one frame when transmitting at the eighth rate, as seen in FIG. 1D. All data is transmitted at a power level independent of rate.

The base station can only determine the sufficiency of the mobile station's transmitted power when it receives a control group. At the eighth rate, only two power control groups are sent every 20 milliseconds, meaning the base station can transmit power control commands twice every 20 milliseconds or 100 times per second. When changing transmission rates from the eighth rate to that needed to send high speed data, power control commands sent twice every 20 milliseconds are not sent often enough to accurately set the power of the mobile station transmitter.

Power control mechanisms on the forward link in this type of communication system use a different mechanism than that on the reverse link. Data is continuously being sent on the forward link regardless of data rate, as shown in FIGS. 1E–1H. FIG. 1E shows data being sent at the full rate, which includes 16 data packets in one frame. Data is repeated in the frame at rates lower than the full rate and the transmit power is scaled downward. FIG. 1F shows data being transferred at the half rate, which shows data packets 1–8 being sent twice in any given frame. FIGS. 1G and 1H show, respectively, packets transmitted at the quarter rate and the eighth rate. By repeating the data at the slower rates, while lowering the transmission power, the average power per frame per group remains substantially constant.

Since data is continuously being transmitted, feedback bandwidth of power control is not an issue, unlike the reverse link. When transmitting on the forward link, the mobile station does not know beforehand at what rate data is being sent. The energy of packets transmitted at the eighth rate may not be sufficient to enable the mobile station to make a correct power control decision. Additionally, the mobile station determines the rate sent by using internal algorithms. Errors in the rate determination will result in errors in determining the sufficiency of power.

SUMMARY OF THE INVENTION

At times, users in a wireless communication system desire to transmit or receive data signals (typically binary data) rather than voice signals. In a variable rate communication system, data signals are preferably transmitted at a much higher rate than voice signals. The high rate of transmission, however, requires significantly more power than the lower rate.

Under one of the embodiments of the present invention, a transmission system, using power control signals, instructs a receiving system to transmit at an intermediate rate, for example a full rate, for a specified period of time preceding the transmission of data at a high rate. This increased transmission rate allows the transmission system to more accurately adjust the receiving station's transmitting power.

In another embodiment of the present invention, the transmission system notifies the receiving system that the transmission system will begin sending data at a predetermined rate for a predetermined time preceding the onset of high speed data. By communicating in this way, potential problems caused by incorrect rate determination by the receiving station are eliminated.

Under a further embodiment of the present invention, the transmission system initially operates at a lower rate, e.g., eighth rate, or idle rate. Data is received for transmission at the high rate. In response thereto, the transmission system instructs the receiving system to increase the bandwidth of its power control transmissions, and can instruct the receiving system that the transmission rate will increase to an intermediate rate. Thereafter, the transmission system can transmit signals at the intermediate rate, between the low and high rates, such as at the full rate. The transmission system adjusts its power control to an appropriate level for transmission at the high rate. The transmission system can also transmit a high rate notification to the receiving system. Thereafter, the transmission system transmits frames at the high rate, while the receiving system receives these frames without need for determining at which rate they were transmitted.

Broadly stated, the present invention embodies a method for use in a communication system having a transmitter and a receiver. The transmitter transmits a signal at a current rate, wherein the current rate corresponds to one of a plurality of rates. When the transmitter receives data for transmission at a high rate, the transmitter first estimates the signal power required to send the data at the high rate, changes the signal power to match the estimated power, and then sends the data signals at the high rate. The method estimates the signal power required and includes the steps of: (a) operating the transmitter at an idle rate; (b) receiving the data for a high rate transfer; (c) estimating a high rate power level; (d) sending a high rate notification to the receiver; and (e) sending the data at the high rate.

BRIEF DESCRIPTION OF THE DRAWINGS

The features and advantages of the present invention will become more apparent from studying the detailed description together with the following figures. In the figures, like reference characters identify similar elements.

FIGS. 1A–1H are charts showing transmission rates of power control data on the forward and reverse links.

DETAILED DESCRIPTION OF THE PREFERRED EMBODIMENTS

A communication system, and in particular, a power control apparatus and method for the system, is described in detail herein. In the following description, numerous specific details are set forth in order to provide a thorough understanding of the present invention. One skilled in the relevant art, however, will readily recognize that the present invention can be practiced without these specific details. In other instances, well-known structures are not shown in detail in order to avoid obscuring the present invention.

Figure 2:
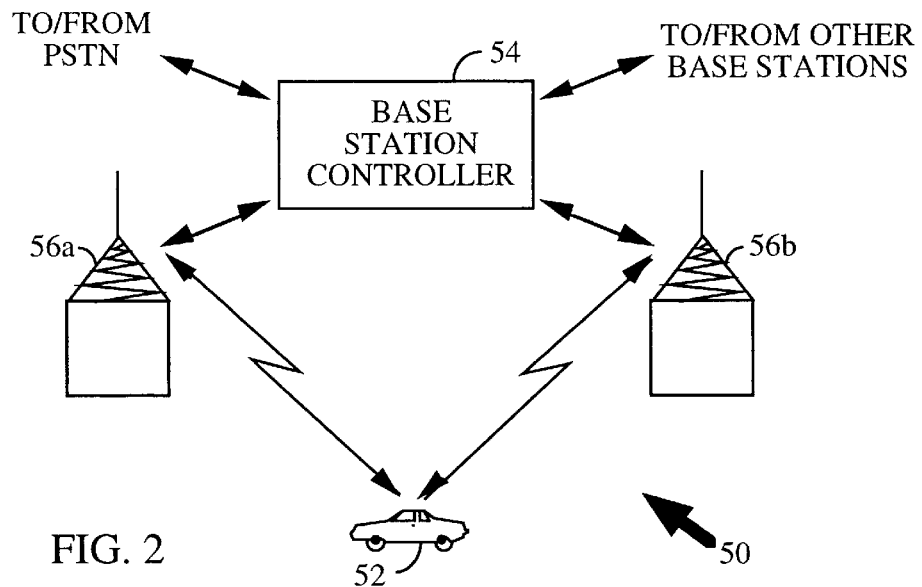
FIG. 2 illustrates a general closed-loop power control system of the present invention.

FIG. 2 illustrates an exemplary cellular subscriber communication system 50 in which the present invention may be embodied. The system of FIG. 2 preferably utilizes spread spectrum modulation techniques such as CDMA for communicating between users of mobile stations (e.g., mobile telephones) and cell-sites or base stations. In FIG. 2, the mobile station 52 communicates with the base station controller 54 by means of one or more bases of the stations 56a, 56b, etc. The base station controller 54 is coupled to and typically includes interface and processing circuitry for providing system control to the base stations 56a and 56b. The base station controller 54 also couples to and communicates with other base stations, and possibly even other base station controllers.

When the system 50 is configured to process telephone calls, the base station controller 54 routes telephone calls from a public switched telephone network (PSTN) to one of the base stations 56a or 56b for transmission to the appropriate mobile station 52. Also, the base station controller 54 functions to route calls from the mobile station 52 via at least one of the base stations 56a or 56b to the PSTN. Additionally, the base station controller 54 connects calls between a mobile station 52 and other mobile stations (not shown).

The base station controller 54 couples to the base stations 56a and 56b by various means such as dedicated telephone lines, optical fiber links or microwave communication links. The double-arrowed lines shown in FIG. 2 define the possible communication links between the mobile station 52 and the base stations 56a and 56b, and between the base stations and the base station controller 54.

Each of the base stations 56a and 56b provides service to a roughly defined, but overlapping, geographical region known as a cell. In which cell a mobile station 52 is currently located generally determines which of the base stations 56a or 56b communicates with the mobile station. When the mobile station 52 moves from one cell to another, the base station controller 54 coordinates a handoff ("soft handoff") from one base station to another, for example, from the base station 56a to the base station 56b. Those skilled in the art will recognize that a handoff may occur for other reasons besides a mobile station 52 moving from one geographic cell site to another, such as changes in system usage of the propagator path.

Figure 3:
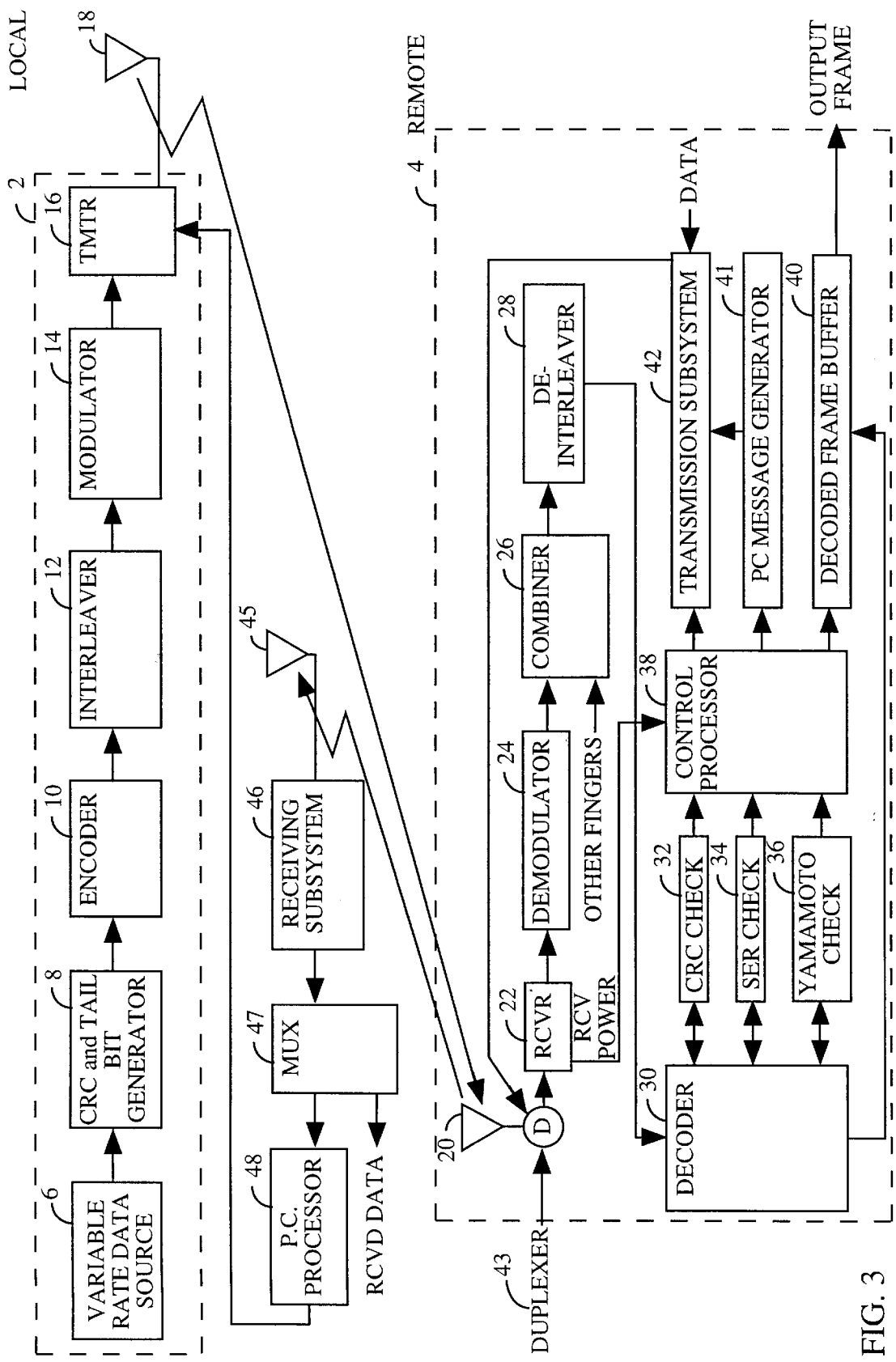
FIG. 3 is a block diagram of a communication system over which the present invention can operate.

FIG. 3 shows more detail of the signal transmission and reception system within the communication system of FIG. 2. Referring to FIG. 3, a first communication device or transmission system 2 transmits data to a second communication device or receiving system 4. The mobile station 52 and the base stations 56a and 56b preferably include both the transmission system 2 and the receiving system 4. In the following description, the present invention is generally described as controlling power from the transmission system 2 at the base station 56a, in accordance with the received power at the receiving system 4 at the mobile station 52. Those skilled in the art, however, will readily recognize that the present invention is equally applicable to power control of the transmission system 2 at the mobile station 52. Additionally, while the mobile station 52 is generally described herein, the invention is equally applicable to any nonmobile (fixed) station. Such mobile and fixed stations are hereinafter collectively referred to as remote stations. In an exemplary embodiment, the present invention is implemented in a wireless communication system which communicates using spread spectrum modulation signals. Communication using spread spectrum communication systems is described in detail in the aforementioned U.S. Pat. Nos. 4,901,307 and 5,103,459.

A variable rate data source 6 provides variable rate data frames for transmission to a Cyclic Redundancy Check (CRC) and Tail Bit Generator 8. In the exemplary embodiment, the data source 6 is a variable rate vocoder for encoding speech information at four variable rates as described in detail in U.S. Pat. No. 5,414,796, entitled "VARIABLE RATE VOCODER," assigned to the assignee of the present invention and incorporated by reference herein. When used, for example, in a cellular telephone environment, the signal is transmitted at the full rate to transmit speech (i.e., when a user is talking) and is transmitted at the eighth rate, or idle rate, to transmit silence (i.e., when the user is not talking). The eighth rate reduces the number of bits transmitted, thereby saving power and reducing interference with other channels. In general, 90% of the signals transmitted by the transmission system 2 to the receiving system 4 are either at the full or one-eighth rate. The one-half and one-quarter rates represent transitional rates between the full and eighth rates.

In the exemplary embodiment, there are two rate sets. A first rate set is used, for example, for transmitting speech data and uses data rates between approximately 1.8 kbs and 9.6 kbs. The second rate set is used for transmitting other digital data and can supply data at higher rates ranging up to, for instance, 64 kbps. The communication system 50 employs the higher rates when transmitting large amounts of data. (The higher rates are generally referred to herein collectively as the "high rate.") Transmitting data at the high rate can be more efficient than transmitting data at the low rate. Therefore, from a power use standpoint, it is preferable to have a short transmission at a high rate than a longer transmission at one of the low rates. Generally, when not transmitting voice or other data, signals are exchanged between the mobile station 52 and the base station 56a at the eighth rate, whereas voice traffic is transmitted at the full rate. Examples of data transmitted at the high rate include video data, modem data, facsimile data, package tracking data, automatic meter reading data, stock market data, Internet data, etc.

Transmitting data at the correct power level reduces data loss and can extend battery life in the mobile station 52. When data is transmitted from the transmission system 2 at a power level too low for conditions, data is lost or received in error. When the transmission system 2 transmits data with too much power, it causes unnecessary interference with other users in the system and reduces system capacity. Additionally, if the transmission system 2 is located in a mobile station 52 with a portable battery, transmitting at the correct power level can extend the time period between charges.

The generator 8 generates a set of CRC bits to provide error detection at the receiver as is well known in the art. In addition, the generator 8 appends a sequence of tail bits to the frame. In the exemplary embodiment, the generator 8 generates the set of CRC and tail bits in accordance with the Telecommunications Industry Association's *TIA/EIA/IS-95-A Mobile Station-Base Station Compatibility Standard for Dual-Mode Wideband Spread Spectrum Cellular System.*

The data frame is provided by the generator 8 to an encoder 10 which encodes the data as symbols for error correction and detection at the receiver. In the exemplary embodiment, the encoder 10 is a rate ½ convolutional encoder. The encoded symbols are provided to an interleaver 12, which reorders the encoded symbols in accordance with a predetermined interleaving format. In the exemplary embodiment, the interleaver 12 is a block interleaver, the design and implementation of which is well known in the art.

The reordered frame is then provided to a modulator 14 which modulates the frame for transmission. In the exemplary embodiment, the modulator 14 is a CDMA modulator, the implementation of which is described in detail in the aforementioned U.S. Pat. Nos. 4,901,307 and 5,103,459. The modulated data frame is provided to a signal transmitter (TMTR) 16. The signal transmitter 16 upconverts and amplifies the signal for transmission through an antenna 18.

The transmitted signal is received by an antenna 20 of the receiving system 4, such as a cellular phone, and provided to a receiver (RCVR) 22 which down converts and amplifies the received signal. The received signal is then provided to a demodulator (DEMOD) 24 which demodulates the signal. In the exemplary embodiment, the demodulator 24 is a CDMA demodulator 24, the implementation of which is described in detail in the aforementioned U.S. Pat. Nos. 4,901,307 and 5,103,459.

The demodulated signal is then provided to a diversity combiner 26. The diversity combiner 26 combines the demodulated signal from the demodulator 24 with demodulated signals from other demodulators (not shown) which demodulate the same signal except provided on a different propagation path. The design and implementation of the diversity combiner 26 is described in detail in the aforementioned U.S. Pat. No. 5,109,390. The diversity combined signal is provided to a de-interleaver 28 which re-orders the symbols in the frame in accordance with a predetermined re-ordering format as is well known in the art.

The re-ordered frame is then provided to a multi-rate decoder 30, which provides error correction on the frame of symbols. The decoder 30 decodes the data based on a predetermined set of rate hypotheses. In the exemplary embodiment, the decoder 30 is a multi-rate Viterbi decoder as is described in detail in the copending U.S. patent application Ser. No. 08/126,477, entitled "MULTIRATE SERIAL VITERBI DECODER FOR CODE DIVISION MULTIPLE ACCESS SYSTEM APPLICATIONS," filed Sep. 24, 1993, assigned to the assignee of the present invention and incorporated by reference herein.

In the exemplary embodiment, the decoder 30 decodes the symbols for each of the possible rates to provide separately decoded frames of data, each of which is provided to a CRC check detector 32. The CRC check detector 32 determines under conventional techniques whether the cyclic redundancy check bits for each frame are correct for the decoded data. The CRC check detector 32 performs a CRC check for the CRC bits in the decoded frames to help determine at which rate the currently received frame was transmitted.

In addition, the decoder 30 provides the decoded data to a symbol error rate (SER) check detector 34. The SER detector 34 receives the decoded bits and an estimate of the received symbol data from the decoder 30. Furthermore, the decoder 30 provides information to a Yamamoto check detector 36 which provides a confidence metric based on the difference between the selected path through a trellis and the next closest path through the trellis.

A control processor 38 receives the CRC check bits, SER values and Yamamoto values from the detectors 32, 34 and 36, respectively. The processor 38 then determines at which of the four rates the currently received frame was sent or declares an erasure. Based on the rate determined by the processor 38 in the absence of a frame erasure, the control processor provides a signal to the decoded frame buffer 40, which in response thereto, outputs the stored frame decoded at the determined rate.

Under the communication system of FIG. 3, the signal transmitted by the transmission system 2 to the receiving system 4 can rapidly change between the transmission rates. In the exemplary embodiment, the signal does not include an indication as to the rate at which the signal is being transmitted. Therefore, the transmission system 2 transmits a frame at a current rate, and a control processor 38 and the decoder 30 of the receiving system 4 determine at which rate the currently received frame was sent. The appropriately decoded signal can then be input to, for example, a vocoder, amplifier and speaker (not shown) to output a voice signal to be heard by a user of the receiving system 4. Further details regarding the estimation of the transmitted rate are described in the inventor's copending U.S. Pat. No. 5,751,725, entitled "METHOD AND APPARATUS FOR DETERMINING THE RATE OF RECEIVED DATA IN A VARIABLE RATE COMMUNICATIONS SYSTEM," issued May 12, 1998, assigned to the assignee of the present invention and incorporated by reference herein.

Figure 4:
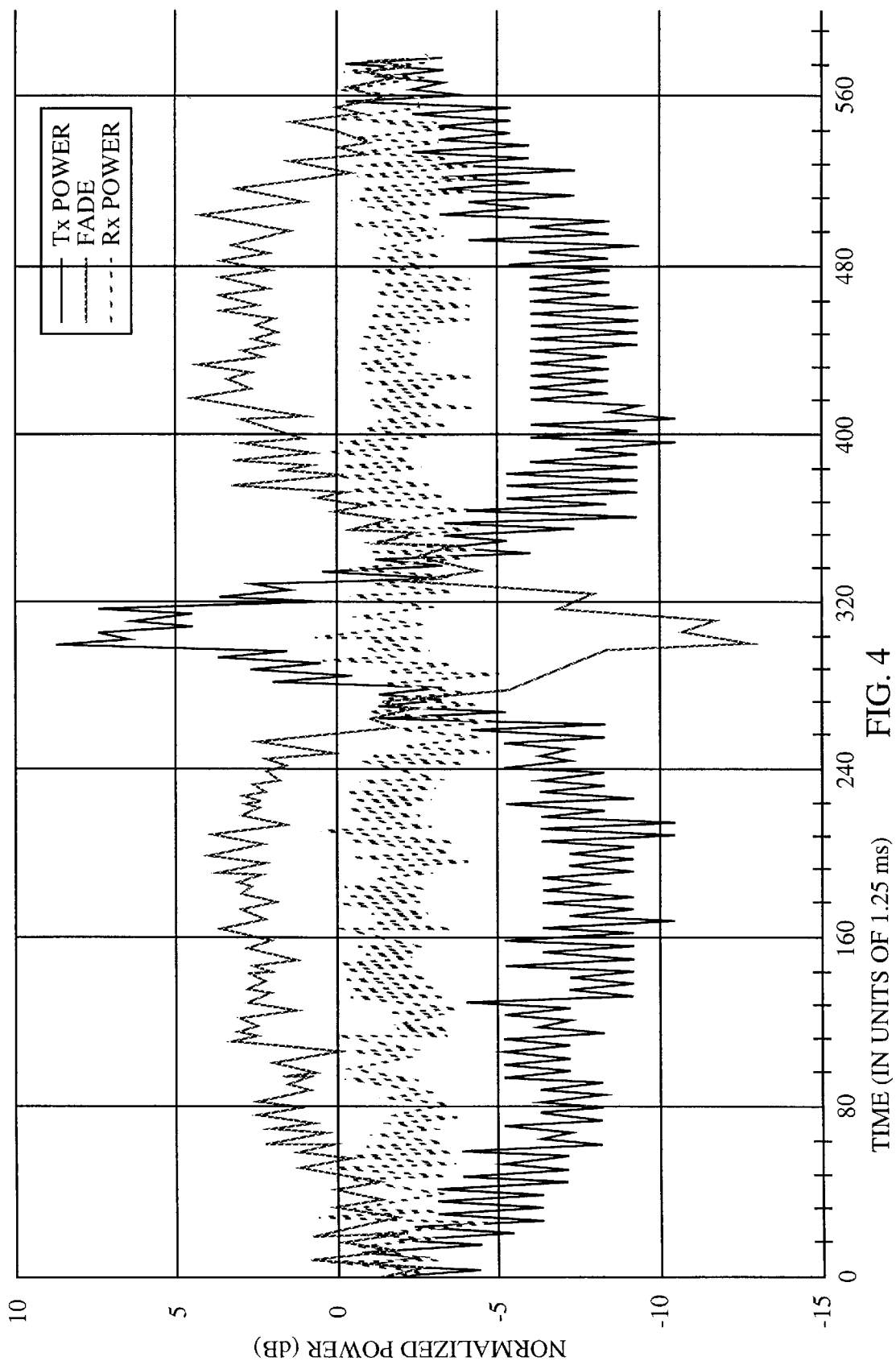
FIG. 4 is an exemplary waveform diagram of normalized power versus time for a transmitted power signal of a forward link channel, fading affecting the forward link channel, and a resulting received power signal of the forward link channel, where a reverse link channel has a large bandwidth and small delay compared to the channel change rate.
Figure 5:
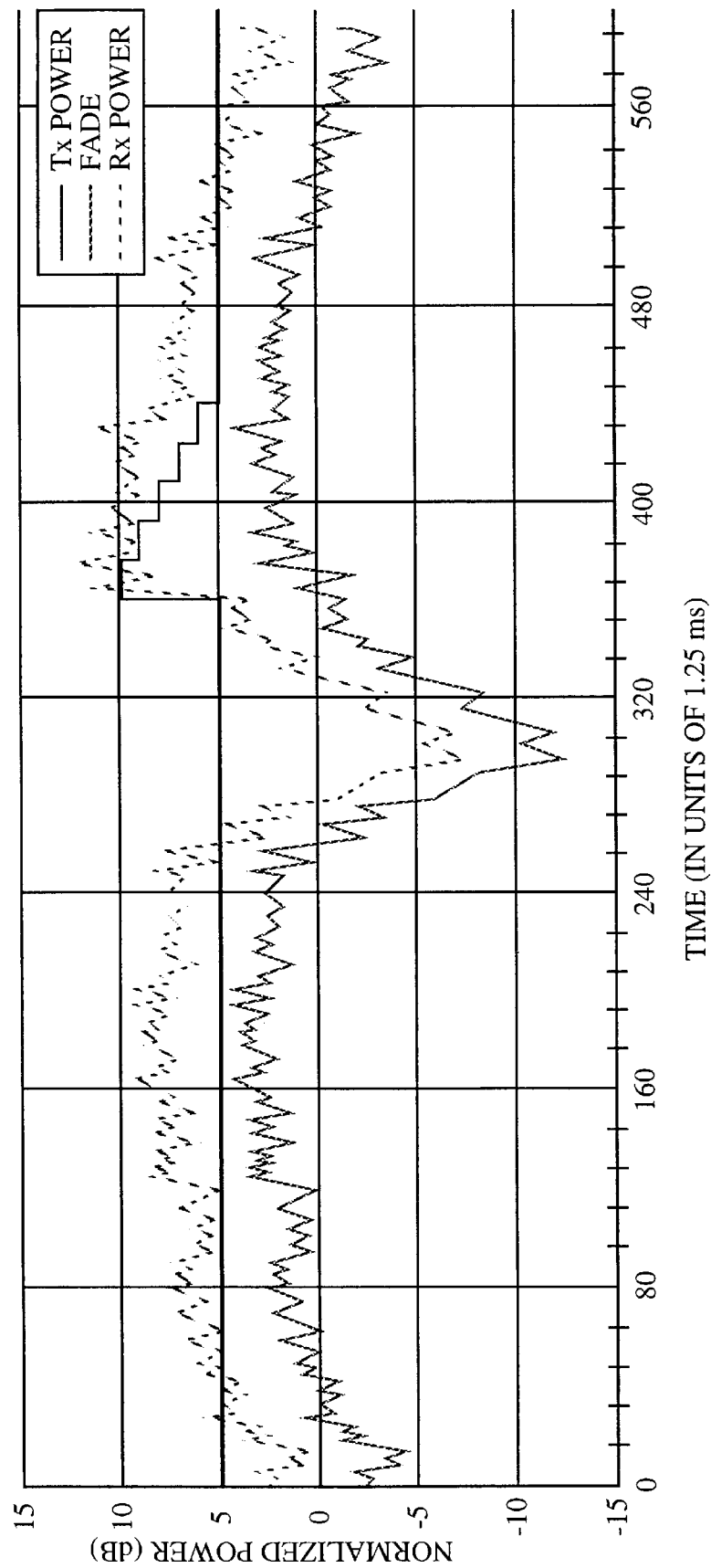
FIG. 5 is an exemplary waveform diagram of normalized power versus time for the transmitted power signal of a forward link channel, fading affecting the forward link channel, and the resulting received power signal of the forward link channel, where the reverse link channel has a small bandwidth and long delay compared to the channel change rate.

As stated above, the transmission system 2 at the mobile station 52 transmits power control messages to the receiving system 4 at the base station 56a. The power control messages reflect the measured power level of the signals received by the receiving system 4. These power control messages can have large or small bandwidths. FIGS. 4 and 5 show examples of power control systems having different power control bandwidths. When the rate of power control messages is high, as in FIG. 4 and when, the delay of changes in power caused by changes in the channel condition is relatively small, the transmission power control reacts quickly in response to changes in the propagation path and the user maintains a clear signal. Conversely, when the power control bandwidth is small, as shown in FIG. 5 and when the delay of changes in power caused by changes in the channel condition is relatively long, the transmission power changes do not quickly react to the degradation in signal quality resulting in an increase in frame errors or the call dropped entirely.

A control processor 38 determines, either based on power received by RCVR 22 or by detection of frame error, whether power should be increased or decreased. A signal indicating this determination is provided to a power control message generator 41. The message generator 41 generates a power control message which is punctured via a transmission subsystem 42 and a duplexer 43 into an outgoing data stream. It is received by a receiving subsystem 46 and provided to a demultiplexer 47 which separates the power control message from data. The power control message is provided to a power control processor 48 which determines any necessary power adjustment.

Figure 6A:
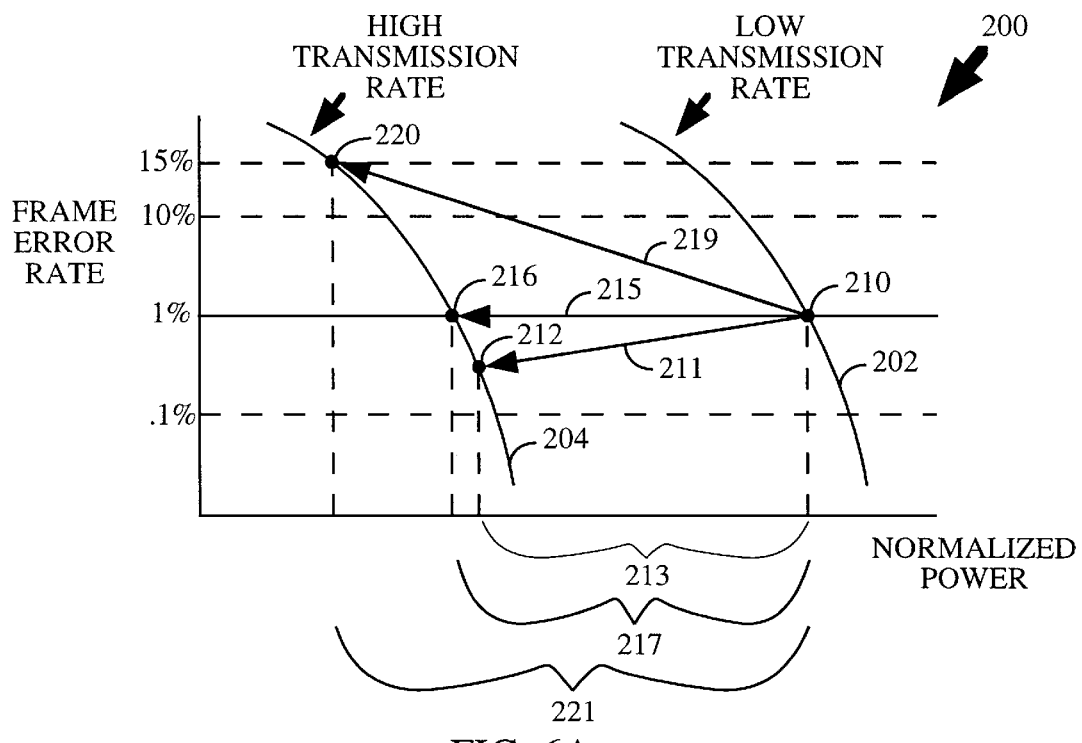
FIG. 6A is a graph showing the normalized power requirements needed to transmit signals at different rates on an Additive White Gaussian Noise channel.
Figure 6B:
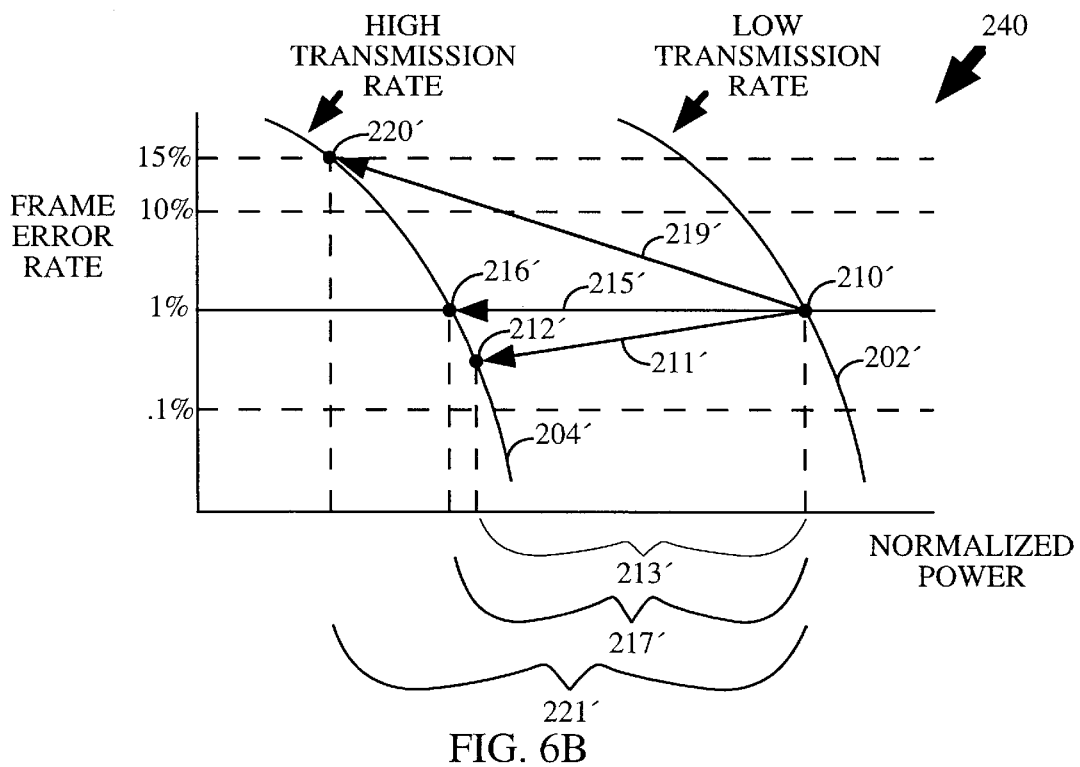
FIG. 6B is a graph showing the normalized power requirements needed to transmit signals at different rates on a fading channel.

The relationship between transmission power and signal quality in a communication system 50 is difficult to quantify because the channel conditions are continuously changing. When the power levels are too high for the channel conditions, unnecessary interference with other transmissions may occur. When the power levels drop too low for the channel conditions, audible dropouts, or incomplete data transmissions occur, as stated above. The relationship between power and error rates is shown in FIGS. 6A and 6B. These figures depict power levels necessary to transmit data at a low rate versus transmitting data at a high rate. FIG. 6A shows these levels in an ideal Additive White Gaussian Noise (AWGN) channel. FIG. 6B depicts these levels in a fading channel.

The graph 200 of FIG. 6A shows normalized power requirements of a transmission system 2 versus a frame error rate plotted on a low rate curve 202 and a high rate curve 204. Normalized power in this exemplary graph is measured in units of bit energy normalized by noise. The curves depict the normalized power necessary to transmit data at different error rates. For instance on the high rate curve 204, it takes less normalized power to transmit data at a 15% error rate, labeled point 220, versus an error rate of 1% labeled point 216. Since data transmission is more efficient at a high rate, the high rate curve 204 appears to the left of the low rate curve 202. However, since many more bits are transmitted at the high rate versus transmitting data at the low rate, more total power can be required to transmit at the high rate. Depending on a number of variables, for instance atmospheric conditions, the normalized power level required for transmitting data at lower rates may be less than that required for transmitting at higher rates. In these circumstances, the high rate curve 204 will appear to the right of the low rate curve 202.

Before changing the transmission rate of data from the low rate set to the high rate set, many options are considered. For example, assume that data transmits at the low rate having a 1% frame error rate, shown as a point 210. For data transmitted at the high rate having the same frame error rate as data transmitted at the low rate, less normalized power is required. Graphically, that change is shown as moving from the point 210 on the low rate curve 202 along a path 215 to a point 216 on the high rate curve 204. The decrease in power per bit for this change in rate is the difference on the normalized power axis of the graph 200, depicted as 217. As stated above, it takes less normalized power per bit to transmit data at a high rate as compared to a low rate, but the overall consumed power is greater, given the greater number of bits.

Data transmitted at a high rate is usually less time sensitive than data transmitted at a low rate. For example, a two second delay in downloading data from the Internet may go unnoticed, whereas a two second delay in a telephone conversation is unacceptable. By increasing the frame error rate of 1% for the low rate to a 15% error rate for the high rate, a power savings is achieved over keeping the error rates the same for both the low and high rates, as shown in the previous example. This scenario is shown on FIG. 6A as traveling along a path 219 from the point 210 on the low rate curve 202 to the point 220 on the high rate curve 204. The per bit power savings is shown as the per bit differences in power, labeled 221, which is the largest savings example shown on the graph 200. Typically, a 15% error rate is unacceptable for such data and is used here for illustration.

Alternatively, changing power levels by a specific amount regardless of error rate changes may be preferred. For example, if data is transmitted at the error rate shown at the point 210, the transmission system 2 could change the normalized power output by a fixed level such as that shown as the per bit power difference, 213. This change causes a frame error rate on the high rate curve 204 to be between 0.1% and 1%, shown as a point 212. The path for this example is shown as traveling along a path 211 from the point 210 to the point 212.

Rate and power level changes are controlled by control processor 38 of FIG. 3. The control processor 38 determines whether the transmitted power of communication device 2 is adequate. The power levels received are examined and compared to a power threshold which varies depending on whether data is being sent at a high or low rate. Alternatively, the control processor 38 compares the number of frames received in error to a threshold error rate which varies depending on whether high rate data or low rate data is sent. Finally, the control processor 38 can adjust the received energy threshold based on a frame error rate threshold that varies based on whether data is sent via the high rate or low rate.

The control processor 38 makes the determinations of the preferred power level in conjunction with receiver 22 and decoder 24. The receiver 22 measures the received energy and provides this data to control processor 38. The mechanism by which the energy is measured by the receiver 22 can be implemented in a number of ways and is well known in the art. Based on that data, the processor can compare the received power to the threshold level as described above. If the control processor 38 determines that the received power signals are below the threshold level, it instructs the power control message generator 41 to generate a message indicating power levels should be increased by a specific amount, as described above. That message is incorporated with other data signals and fed to the transmission subsystem 42, leading to the duplexer 43, and the signals are transmitted from the receiving system 4 via the antenna 20. These signals are transmitted to and received by an antenna 45 of the transmission system 2, but could also be received at the antenna 18 and then travel through another duplexer (not shown). These power control signals are transferred to the receiving subsystem 46 which in turn transfers them to the demultiplexer 47 to strip out the data signals for use in other parts of the receiving system 4. The power control signals are then fed to the power control processor 48 which changes the power levels by the specific amount determined by the control processor 38 of the receiving system 4.

Additionally, the decoder 22 provides to the control processor 38 data relating to frames received in error. The control processor 38 can then analyze frames received in error or calculate the rate of frames received in error. Once compared, the control processor 38 sends to the power control message generator 41, a signal indicating the frame error rate should be changed, as described above. From that point, the method of communicating the power control change is identical to the preceding paragraph.

The exemplary graph 240 of FIG. 6B shows curves similar to those in graph 200, but for a fading channel. Power levels are shown changing from a point 210' on a low rate curve 202' to points 220', 216', and 212' on a high rate curve 204', along paths 219', 215', and 211', respectively. Corresponding changes in normalized power are seen at 221', 217', and 213'.

There are several reasons why different transmitting power levels are necessary depending on the transmission rate. First, the transmission system 2 takes more power to transmit data at a high rate as compared to transmitting it at a low rate. Second, the transmission system 2 needs differing power levels because of changes in the frame error rate. For example, changing the frame error rate levels from the point 212 to the point 220 in FIG. 6A reduces the power required for transmission while keeping the rate of data transmission the same. Third, the transmission system 2 uses different amounts of power because of different channel conditions. It takes more power to transmit data at a high rate in a noisy (fading) channel compared to transmitting it in an ideal AWGN channel. Additionally, transmitter power levels can differ because of the bandwidth of the power feedback channel. As stated above, if the feedback bandwidth is small and power level changes compensating for changing conditions cannot be made rapidly, estimation of power needed to transmit data at a high rate may be inaccurate.

A way to increase the power efficiency in a transmission system 2 can be seen graphically in an example using FIG. 6A. The low transmission rate curve 202 approximates the normalized power used for all of the low rates, including the eighth, quarter, half, and full rates. A change in the transmission rate from one of these low rates to another low rate, even when also changing frame error rates, will not save much power. This is contrasted to a per bit power savings of transmitting data at the high transmission rate shown in FIG. 6A as the curve 204. Not only is each bit transferred in a more power-efficient manner than at the low rate, but also a larger number of bits are transferred. Thus, the per bit savings for every bit transmitted at the high rate multiplied by the number of bits transmitted totals a large power savings.

While transmitting data at the high rate is efficient, the large number of bits transmitted requires a large amount of power. Because the base station 56a has a limited amount of power for all of the transmissions within that base station, it is possible that more transmissions are desired to be made than can be made. Sometimes, some of the transmission systems 2 require all of the power within a base station 56a for a short period of time, such as during high rate transmissions. When this occurs, other transmission systems 2 that are trying to send data at the same time are forced to wait until the base station 56a completes one of the current transmissions. With the power savings gained by this invention, a more efficient distribution of the limited power in a base station 56a is obtained.

Figure 7:
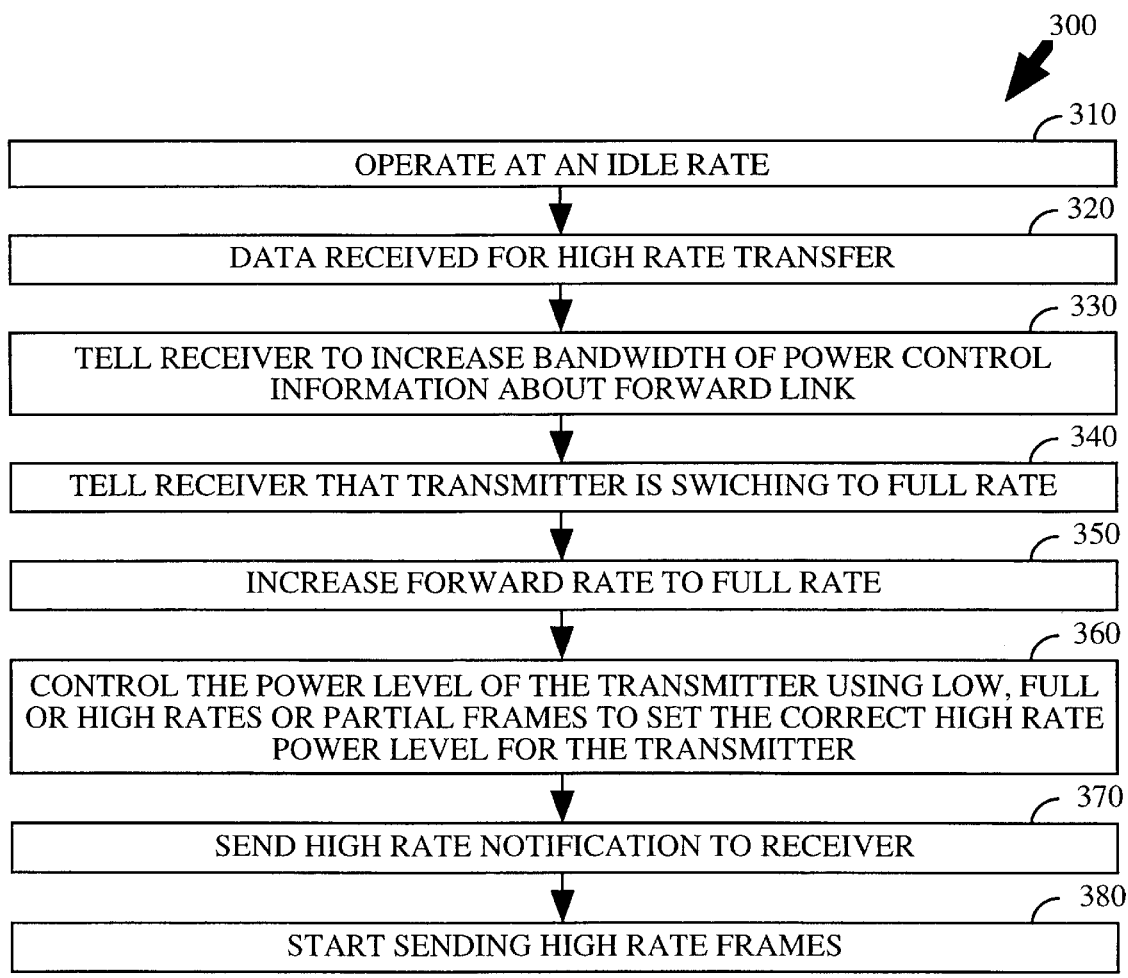
FIG. 7 is a flowchart illustrating a method of the present invention for changing the power transmission levels to a data rate from a low rate.

Referring to FIG. 7, an exemplary routine 300 is shown for changing the power levels when sending data at the high rate after sending data at one of the low rates. This method uses an efficient system of tailoring the power requirements for better overall communication within the system 50.

Routine 300 begins at step 310 with the transmission system 2 of the base station 56a operating at an idle rate. This rate occurs when the base station 56a is sending no voice or data to the receiving system 4 in the mobile station 52. Unless transmitting a large amount of data, the transmission system 2 is normally in this idle state. For example, in the exemplary variable rate decoder, the transmission system 2 returns to this idle rate from the full rate during pauses in a normal telephone conversation. Data is presented to the base station 56a for a high rate transfer in step 320. This data could be any data to be transmitted at the high rate as described above. Such data may need to be transmitted at the high rate for reasons such as the type of data being transmitted, as well as for reasons of time, power savings, or overall efficiency of the communication system 50. For example, an automatic meter reading may not necessarily need to be transmitted in a short time period. However, if it is more efficient for the communication system 50 to transmit this data at a high rate having a power savings over the low rate, it is more efficient to transmit this data at the high rate. Additionally, during polling of multiple meters, large amounts of data typically must be transmitted during a short period of time.

In step 330, the base station 56a sends a signal to the mobile station 52 to increase the bandwidth of the forward link power control information transmitted over the reverse link. Increasing the power control bandwidth on the reverse link causes information to be sent at a higher rate to the transmission system 2 indicating the quality of the forward link. It is accomplished by the base station 56a sending an appropriately encoded signal which is decoded by the mobile station 52. The mobile station 52 in response thereto increases the bandwidth of its power control information, by, e.g., transmitting one or more power control messages per several frames. The power control messages can be transmitted, or punctured, within the voice or traffic channel, or transmitted over an alternative channel. The methods for transmitting power control messages are known to those skilled in the art, such as described in the patents noted above.

The increased power control information is necessary to accurately predict the power needed to transmit data at the higher data rate over the forward link. Without a good prediction, data signals may be lost if the power is too low, or they may impair other data transmissions if the power is too high. Since more power is required when sending data at the high rate, due to the large number of bits, power saving is more critical than when transferring data at the low rate.

In step 340, the transmission system 2 at the base station 56a sends a signal to the receiving system 4 in the mobile station 52 indicating that the transmitter will begin transmitting frames at the full rate. Although it is possible for the receiving system 4 to determine the transmission rate, fewer errors occur in such determinations if the receiver is informed at which rate frames are transmitted. The base station 56a instructs the mobile station 52 that the base station is switching to the full rate by sending an appropriate control signal. The control signal informs the mobile station 52 that the next frame (or some number N frames thereafter) will be transmitted at the full rate. More specifically, the signal instructs the mobile station 52 to decode the next (or Nth) frame at the full rate, rather than computing the CRC, SER and Yamamoto values and determining the rate therefrom. Thus, the mobile station 52 makes no errors in determining the rate of the next received frame.

After informing the mobile station 52 that the base station 56a is switching to full rate in step 340, the base station in fact switches to the full rate in optional step 350. One reason the transmission system 2 transmits frames at the full rate in step 350 is to provide more power control information about the forward link channel to the receiving system 4 in mobile station 52. One reason more power control information is gathered at the full rate rather than the idle rate is the frequency at which the power control information can be measured. This information is sent once every frame when transmitting at the full rate, whereas the information is sent only once every ten frames when operating at the idle rate, as in step 310. Another reason that there is more power control information at the full rate is because data is transmitted more often at the full rate than at the idle rate.

In step 360, the transmission system 2 in the base station 56a estimates the power level necessary for transmitting frames at the high rate. The transmission system 2 employs the power control information received from the receiving system 4 (at the full rate) to estimate the forward link channel conditions. For example, if the forward link channel is similar to an AWGN channel (FIG. 6A), less power is required than if the channel suffers from fading (FIG. 6B).

In step 360, the transmission system 2 in the base station 56a can also attempt to obtain additional power control information so as to more accurately estimate the forward link channel condition and the amount of power necessary to transmit frames at the high rate. For example, the transmission system 2 may transmit one or more frames at the high rate, for a short period of time, and then interpret the power control messages received in response thereto. Therefore, although it uses more power, it is advantageous to initially transmit signals at higher rates, even for a short period of time, in order to more accurately predict the power levels necessary for data transmission at the data rate. The power level is predicted more accurately because there is a greater signal to noise ratio when transmitting at the full or high rates than when transmitting at a lower rate.

In a related embodiment, the feedback bandwidth of the reverse link is increased, thereby providing information concerning the forward link channel conditions faster than the information had been provided previously. The feedback bandwidth on the reverse link is increased by changing from the eighth, or idle rate, to either the quarter, half, or full rates. This embodiment can be used alone, or combined with the higher rate of forward link communication, as described above, for even greater power control efficiency.

In an alternative embodiment, the receiving system 4 in the base station 56a stores a power level previously measured when data was previously sent at the high rate. In this embodiment, power and time spent to estimate the proper new power level is decreased or avoided if the channel condition is similar to that previously used. In this case, the transmission system 2 requests the receiving system 4 to set the transmitter power at the setting previously used for high rate transfers. The transmission system 2 then transmits one or more frames at this recalled power setting. The recalled power setting is evaluated for the current conditions of the channel, if the channel is substantially unchanged from the prior transmission, the recalled power level is appropriate.

Increased power control management may also be used for greater efficiency of high rate data transmission on the reverse link. If the reverse link is operating at the idle, or eighth rate, and data is received for transmission along the reverse link, one embodiment allows the reverse link to change transmission rates to the full rate, which concurrently increases the feedback bandwidth for better performance.

In another embodiment, the reverse link power control bandwidth can be increased by other means if the system is not currently based on the reverse link channels. For example, the base station 56a could direct the mobile station 52 to transmit at a given rate not based on channel conditions, as described above.

In a further embodiment, the mobile station 52 can transmit data on the reverse link at a higher power level, which is then used by the base station 56a to improve measurement accuracy as described above.

Finally, any or all of the above embodiments for preparing the reverse channel for high rate transmission can be combined for even greater accuracy of power control and efficiency of data transmission.

Step 360 promotes efficiency because it allows the mobile station 52 and base station 56a to estimate and then test the proper power level necessary to send data at the high rate. The purpose of such precise estimation is to ensure that the data transferred at the high rate will have enough power to be properly decoded, but not so much power as to temporarily prohibit other transmissions. When each mobile station 52 and base station 56a are operating at their highest efficiency, the efficiency of the communication system 50 is maximized.

In step 370, the transmission system 2 in the base station 56a sends a high rate notification to the receiving system 4 in the mobile station 52. This step is similar to step 340, and is necessary to avoid data loss which can happen when incorrectly determining the transmission rate, as noted above. After the power level has been correctly set and the mobile station 52 has been properly notified about the increased data rate, the base station 56a sends frames at the high data rate. The frames are transmitted over the forward link channel at the power previously estimated under step 360. While such data is transmitted at the high rate, the mobile station 52 continues to transmit power control messages back to the base station 56a. Therefore, the base station 56a, while transmitting at the high rate, appropriately adjusts the power if the previously estimated power level was incorrect. In general, the routine 300 allows the system 50 to increase its transmission rate and power control feedback to estimate the proper power at which to transmit frames at the high rate. Thus, an advantage over the prior art is that less power is wasted by sending the data with excess power without estimating channel conditions, and data loss by transmitting the data with insufficient power is minimized.

The teachings provided herein of the present invention can be applied to other communication systems, not necessarily the exemplary CDMA communication system described above. For example, the present invention is equally applicable to other digital or analog cellular communication systems. The present invention can also be modified, if necessary, to employ the systems, circuits and concepts of the various patents and applications described above, all of which are incorporated herein by reference as if set forth in their entirety.

These and other changes can be made to the invention in light of the above detailed description. In general, in the following claims, the terms used should not be construed to limit the invention to the specific embodiments disclosed in the specification and the claims, but should be construed to include any communication system that operates in accordance with the claims to provide channel quality monitoring and power control. Accordingly, the invention is not limited by the disclosure, but instead its scope is to be determined entirely by the following claims.

We claim:

1. In a communication system having at least one base station and at least one user station, transmitting signals over forward and reverse links, respectively, said forward and reverse links each containing a communication channel and a feedback channel and each channel having a separate channel bandwidth, a method for controlling transmission signal power in said communication system comprising the steps of:

sending signals at a low rate from at least one of said user stations and said base station;

receiving for transmission data signals at a data rate, said data rate being faster than said low rate;

increasing said bandwidth of said feedback channel of said reverse link;

receiving increased bandwidth power control signals over said feedback channel of said reverse link; and estimating said transmission signal power required to send data signals at a data rate based on said increased bandwidth power control signals changing said transmission signal power to match said selected transmission signal power of said data rate;

sending data signals at said data rate from at least one of said user stations and said base station.

2. In a communication system having at least one base station and at least one user station, transmitting signals over forward and reverse links, respectively, said forward and reverse links each containing a communication channel and a feedback channel, each channel having a separate channel bandwidth, a system comprising:

means for sending data transmissions at a low rate, said transmissions sent at a signal transmission power;

means for receiving for transmission data at a data rate, said data rate being faster than said low rate;

means for increasing said bandwidth of said feedback channel of said reverse link;

means for receiving increased bandwidth power control signals over said feedback channel of said reverse link; and means for estimating said transmission signal power required to send data signals at a data rate based on said increased bandwidth power control signals;

means, coupled to said means for sending, for changing said signal transmission power to match said estimated transmission signal power; and means, coupled to said means for changing, for transmitting data transmissions at said data rate.

3. A communication system comprising:

a base station configured normally to transmit a current communication signal as a forward link signal at a transmission signal power corresponding to a low data rate;

at least one user station configured to receive said current communication signal, determine a level of said current communication signal, and transmit a current control message as a reverse link signal;

wherein said forward link and said reverse link each contain a communication channel and a feedback channel, each channel having a separate channel bandwidth; and wherein said base station is configured to instruct said mobile station to increase said bandwidth of said feedback channel of said reverse link, receive an increased bandwidth control message over said feedback channel of said reverse link, and estimate said transmission signal power required to send data signals at a data rate based on said increased bandwidth control message.

* * * * *